United States Patent [19]

Yamada et al.

[11] Patent Number: 4,553,854
[45] Date of Patent: Nov. 19, 1985

[54] METHOD FOR CONTINUOUSLY MEASURING SURFACE TEMPERATURE OF HEATED STEEL STRIP

[75] Inventors: Takeo Yamada, Yokohama; Naoki Harada, Narashino; Kiyotaka Imai, Yokohama, all of Japan

[73] Assignee: Nippon Kokan Kabushiki Kaisha, Tokyo, Japan

[21] Appl. No.: 558,943

[22] Filed: Dec. 7, 1983

[30] Foreign Application Priority Data

Dec. 17, 1982 [JP] Japan .............................. 57-220084
Mar. 8, 1983 [JP] Japan .............................. 58-36687

[51] Int. Cl.$^4$ .......................... G01J 5/10; G01K 13/06
[52] U.S. Cl. .................................... 374/129; 250/338; 374/9; 374/170
[58] Field of Search .................... 374/129, 9, 132, 123, 374/126, 170; 356/43, 45; 364/557

[56] References Cited

U.S. PATENT DOCUMENTS

| | | | |
|---|---|---|---|
| 2,846,882 | 8/1958 | Gray | 374/126 |
| 3,057,200 | 10/1962 | Wood | 374/123 |
| 3,482,448 | 12/1969 | Gafford | 356/43 X |
| 3,765,779 | 10/1973 | Hunt et al. | 374/129 X |
| 3,796,099 | 3/1974 | Shimotsuma et al. | 374/129 X |
| 4,172,383 | 10/1979 | Iuchi | 374/9 |
| 4,417,822 | 11/1983 | Stein et al. | 374/129 |
| 4,465,382 | 8/1984 | Iuchi et al. | 364/126 X |

FOREIGN PATENT DOCUMENTS 2262737  7/1983  Fed. Rep. of Germany ...... 374/129

OTHER PUBLICATIONS

Journal of the Iron and Steel Institute of Japan, No. 1, vol. 65, Jan. 1979, "A Method for Simultaneous Measurement . . . ", pp. 97-107.

Primary Examiner—Daniel M. Yasich
Attorney, Agent, or Firm—Frishauf, Holtz, Goodman & Woodward

[57] ABSTRACT

A method for continuously measuring the surface temperature of a heated steel strip, includes providing a flat reflecting plate so as to face a heated steel strip at an angle of inclination ($\alpha$) with the steel strip. A radiation thermometer measures the amount of heat radiation energy which is emitted from an arbitrary point on the surface of the steel strip and comes directly into the radiation thermometer; and the thermometer also measures the total sum of heat radiation energy which (a) is emitted from a different point on the surface of the steel strip and comes into the radiation thermometer after having been reflected at least twice between the steel strip and the reflecting plate and, (b) is emitted from a final reflecting point, on the steel strip, of the heat radiation from said different point. The emissivity of the steel strip is computed on the basis of said total sum of the energies of the heat radiations and the amount of energy of the heat radiation from the arbitrary point; and the surface temperature of the steel strip is measured on the basis of the computed emissivity and the amount of energy of a reference heat radiation. The final angle of reflection ($\theta$) from the steel strip of the heat radiation from said different point, and the angle of inclination ($\alpha$) of the reflecting plate, are set at values which satisfy specific limits.

8 Claims, 13 Drawing Figures

METHOD FOR CONTINUOUSLY MEASURING SURFACE TEMPERATURE OF HEATED STEEL STRIP

REFERENCE TO PATENTS, APPLICATIONS AND PUBLICATIONS PERTINENT TO THE INVENTION

As far as is known, the only document pertinent to the present invention is a paper entitled "A Method for Simultaneous Measurement of Both Temperature and Emissivity, and Its Applications to Steel Processes", released in the technical journal "Tetsu-to-Hagane" (which means "Iron and Steel") and published in Japan on Jan. 1, 1979.

The contents disclosed in the above-mentioned prior art document will be discussed later under the heading of the "BACKGROUND OF THE INVENTION".

FIELD OF THE INVENTION

The present invention relates to a method for continuously measuring the surface temperature of a heated steel strip utilizing heat radiations emitted from the surface of the heated steel sheet.

BACKGROUND OF THE INVENTION

When continuously heating a steel strip in a heating furnace, for example, measurement of the surface temperature of the steel strip heated in the heating furnace is very important in controlling the heating operation of the steel strip in the heating furnace.

The surface temperature of a heated steel strip is generally measured with a radiation thermometer, and accurate determination of emissivity of the surface of the steel strip is essential for the accurate measurement of the surface temperature of the steel strip.

A method for measuring the surface temperature of a heated steel strip through calculation of the surface emissivity of the heated steel strip is disclosed in a paper entitled "A Method for Simultaneous Measurement of Both Temperature and Emissivity, and Its Applications to Steel Processes", released in the technical journal "Tetsu-to-Hagane" (which means "Iron and Steel") and published in Japan on Jan. 1, 1979 (hereinafter referred to as the "prior art"). The prior art is described below with reference to the drawings.

Figure 1:
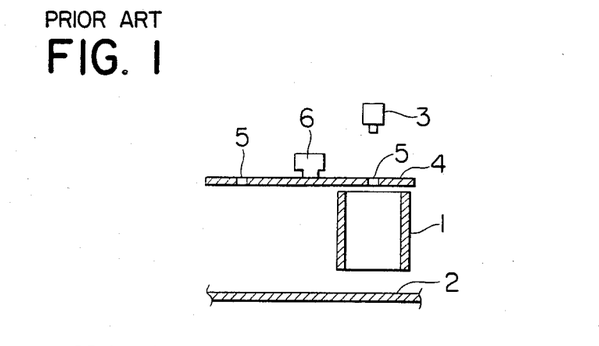
FIG. 1 is a descriptive front view illustrating the method for measuring the surface temperature of a heated steel strip of the prior art.
Figure 2:
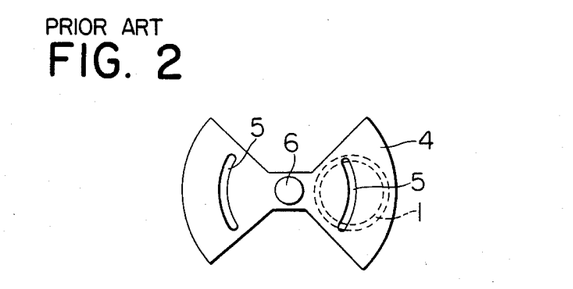
FIG. 2 is a descriptive plan view of FIG. 1.

FIG. 1 is a descriptive front view illustrating the method for measuring the surface temperature of a heated steel strip of the prior art, and FIG. 2 is a descriptive plan view of FIG. 1. As shown in FIGS. 1 and 2, a cylindrical reflecting plate 1 is vertically provided above the surface of a heated steel strip 2, spaced apart from the surface thereof. The inner surface of the cylindrical reflecting plate 1 is plated with gold so as to efficiently reflect heat radiation emitted from the surface of the steel strip 2. A radiation thermometer 3 is provided above the cylindrical reflecting plate 1 and on the axial line of the cylindrical reflecting plate 1. A rotary chopper 4 having a pair of slits 5 is horizontally provided adjacent to the top end of the cylindrical reflecting plate 1. The rotary chopper 4 rotates at a constant speed by a motor 6 and opens and closes the upper opening of the cylindrical reflecting plate 1.

Figure 3A:
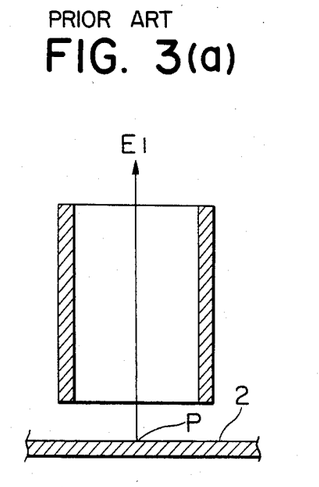
Figure 3B:
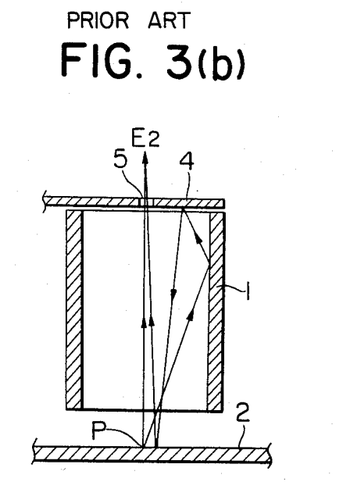

As shown in FIG. 3(a), when the rotary chopper 4 opens the upper opening of the cylindrical reflecting plate 1, an amount of energy $E_1$ of a heat radiation which is emitted from a point P on the surface of the steel strip 2 and comes directly into the radiation thermometer 3, is measured by the radiation thermometer 3. Then, as shown in FIG. 3(b), when the rotary chopper 4 closes the upper opening of the cylindrical reflecting plate 1, the total sum $E_2$ of the amount of energy $E_1$ of the heat radiation emitted from the point P and an amount of energy of a heat radiation which is emitted also from the point P and comes into the radiation thermometer 3 through the slit 5 of the rotary chopper 4 after having been reflected several times among the surface of the steel strip 2, the inner surface of the cylindrical reflecting plate 1 and the inner surface of the rotary chopper 4, is measured by the radiation thermometer 3. The amount of energy $E_2$ is larger than the amount of energy $E_1$, and these are expressed by the following formulae:

$$E_1 = \epsilon \cdot E_b(T) \quad (1), \text{ and}$$

$$E_2 = g(\epsilon) \cdot E_b(T) \quad (2)$$

where,
- $\epsilon$: emissivity of the surface of the steel strip 2,
- $E_b(T)$: amount of energy of heat radiation emitted from the surface of a perfect blackbody having a temperature T (in other words, $E_b(T)$ means the amount of energy of a reference heat radiation), and
- $g(\epsilon)$: apparent emissivity of the surface of the steel strip 2.

Since the amount of energy $E_2$ is larger than the amount of energy $E_1$, as described above, the apparent emissivity $g(\epsilon)$ is larger than the emissivity $\epsilon$. The emissivity $\epsilon$ can be calculated by the following formula on the basis of the mutual reflection theory:

$$g(\epsilon) = \epsilon(\alpha+1)/(\epsilon+\alpha) \quad (3)$$

where,
- $\alpha$: constant dependent upon the shape and the reflection characteristics of the cylindrical reflecting plate 1.

Therefore, Formula (2) can be expressed as follows:

$$E_2 = E_b(T) \cdot \epsilon(\alpha+1)/(\epsilon+\alpha) \quad (4)$$

From Formulae (1) and (4), the emissivity $\epsilon$ can be expressed as follows:

$$\epsilon = \left(\alpha + 1 - \alpha \frac{E_2}{E_1}\right) \bigg/ \left(\frac{E_2}{E_1}\right) \quad (5)$$

From Formulae (1) and (5), $E_b(T)$ can be expressed as follows:

$$E_b(T) = E_2 \bigg/ \left[\alpha + 1 - \alpha \frac{E_2}{E_1}\right] \quad (6)$$

In Formula (6), $E_1$, $E_2$ and $\alpha$ are known. It is therefore possible, by means of Formula (6), to calculate the amount of energy $E_b(T)$ of heat radiation emitted from the surface of the steel strip 2 on the assumption that the steel strip 2 is a perfect blackbody. Since the temperature corresponding to the amount of energy $E_b(T)$ is previously known, the surface temperature of the steel strip 2 can be determined from the amount of energy $E_b(T)$.

The above-mentioned prior art involves however the following problems: Because of the complicated paths of reflection of the heat radiation among the surface of the steel strip 2, the inner surface of the cylindrical reflecting plate 1 and the inner surface of the rotary chopper 4, it is impossible to calculate the number of reflections of the heat radiation, leading to complicated calculations for determining the surface temperature of the steel strip 2. In addition, because of the necessity of providing the rotary chopper 4 adjacent to the top end of the cylindrical reflecting plate 1, the temperature measuring apparatus requires a large space, resulting in restrictions on the site of installation of the apparatus.

Under such circumstances, there has been a demand for the development of a method allowing simpler measurement of the surface temperature of a heated steel strip and requiring a smaller space for the temperature measuring apparatus, but such a method has not as yet been proposed.

SUMMARY OF THE INVENTION

An object of the present invention is therefore to provide a method allowing simpler measurement of the surface temperature of a heated steel strip and requiring a smaller space for the temperature measuring apparatus, by making it possible to accurately calculate the number of reflections of a heat radiation between the surface of the steel strip and that of the reflecting plate.

In accordance with one of the features of the present invention, there is provided a method for continuously measuring the surface temperature of a heated steel strip, which includes:

providing a flat reflecting plate so as to face a travelling heated steel strip, at a first angle of inclination with the steel strip;

directing a radiation thermometer at a second inclination angle relative to the steel strip;

continuously measuring with the raidation thermometer the amount of heat radiation energy which is emitted from an arbitrary point on the surface of said steel strip and comes directly into said radiation thermometer;

continuously measuring with said radiation thermometer the total sum of (a) an amount of heat radiation energy which is emitted from at least one different point on the surface of said steel strip other than said arbitrary point and comes into said radiation thermometer after having been reflected at least twice between the surface of said steel strip and the surface of said reflecting plate, and (b) the amount of heat radiation energy emitted from a point corresponding to a final reflection point, on the steel strip of the heat radiation from said at least one different point;

continuously calculating emissivity of the surface of said steel strip on the basis of the thus measured total sum of the amounts of energy of the heat radiations emitted from said at least one different point, and said amount of energy of said heat radiation emitted from said arbitrary point;

continuously measuring the surface temperature of said steel strip on the basis of the thus calculated emissivity and an amount of energy of a reference heat radiation emitted from the surface of a perfect blackbody; and determining a final angle of reflection ($\theta$) on the surface of the steel strip of said heat radiation emitted from said at least one different point and reflected at least twice between the steel strip surface and the surface of the flat reflecting plate, and said prescribed angle of inclination ($\alpha$) of said reflecting plate with said steel strip at values which satisfy the following limits:

$$40° \leq \theta < 90° \quad \text{(A); and}$$

$$40° \leq \theta + 2\alpha \leq 140° \quad \text{(B).}$$

BRIEF DESCRIPTION OF THE DRAWINGS

FIG. 3($a$) is a descriptive front view illustrating the path of an incident heat radiation coming into a radiation thermometer from the surface of a heated steel strip when opening the upper opening of a cylindrical reflecting plate in the prior art;

FIG. 3($b$) is a descriptive front view illustrating the paths of an incident heat radiation coming through a slit of a cylindrical reflecting plate into a radiation thermometer from the surface of a heated steel strip when closing the upper opening of the cylindrical reflecting plate in the prior art;

DETAILED DESCRIPTION OF PREFERRED EMBODIMENTS

From the point of view as mentioned above, extensive studies were carried out to develop a method allowing simpler measurement of the surface temperature of a heated steel strip and requiring a smaller space for the temperature measuring apparatus. As a result, the following findings were obtained: By providing a flat reflecting plate so as to face a heated steel strip at a prescribed angle of inclination with the steel sheet, it is possible to easily calculate the number of reflections of a heat radiation between the surface of the steel strip and that of the reflecting plate, and consequently, it is possible to simple measure the surface temperature of the steel strip and to achieve a compact temperature measuring apparatus.

The present invention was conceived on the basis of the above-mentioned findings. The method for continuously measuring a surface temperature of a heated steel strip of the present invention is described below with reference to the drawings.

Figure 4:
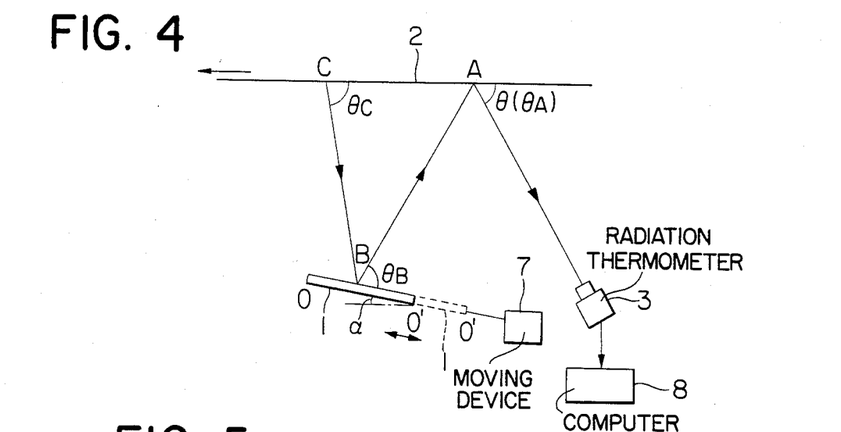
FIG. 4 is a descriptive front view illustrating the first embodiment of the method of the present invention.

FIG. 4 is a descriptive front view illustrating the first embodiment of the method of the present invention. As shown in FIG. 4, a flat reflecting plate 1 is provided below a horizontally travelling heated steel strip 2 spaced apart from the surface thereof so as to face the steel strip 2 at a prescribed angle of inclination α with the steel strip 2. The line formed by the intersection of the extended plane of the reflecting plate 1 with the surface of the steel strip 2 is normal to the plane of the drawing, i.e., substantially perpendicular to the travelling direction of the steel strip 2. The reflecting plate 1 is made of aluminum or other materials having a known reflectivity. A radiation thermometer 3 measures an amount of energy of a heat radiation which is emitted from the surface of the steel strip 2 and comes into the radiation thermometer 3 along the optical axis thereof. The radiation thermometer 3 is provided at an angle with the steel strip 2 so that the angle between the optical axis of the radiation thermometer 3 passing through a point A on the surface of the steel strip 2 and the surface of the steel strip 2 becomes θ, with a prescribed distance to the steel strip 2, on the side of end O' of the reflecting plate 1 which has a longer distance from the steel strip 2 than the other end O of the reflecting plate 1. Therefore, a heat radiation emitted from another point C on the surface of the steel strip 2 apart from the point A by a prescribed distance is reflected at a point B on the surface of the reflecting plate 1, and then reflected at the point A with an angle of reflection $\theta_A$ (equal to θ) to come into the radiation thermometer 3. A moving device 7 reciprocally moves the reflecting plate 1 in the longitudinal direction thereof between the position at which the heat radiation emitted from the point C on the surface of the steel strip 2 is reflected at the point B on the surface of the reflecting plate 1, and a position not reflecting this heat radiation. A computer 8 calculates the surface temperature of the steel strip 2 on the basis of the amount of energy of a heat radiation which is emitted from the surface of the steel strip 2, directly or after reflection into the radiation thermometer 3, and is measured thereby.

When the reflecting plate 1 is moved by the moving device 7 to a position where the heat radiation emitted from the point C on the surface of the steel strip 2 is not reflected at the point B on the surface of the reflecting plate 1, only the heat radiation emitted from the point A on the surface of the steel strip 2 comes into the radiation thermometer 3. At this moment, the amount of energy $E_1$ of the heat radiation measured by the radiation thermometer 3 is expressed as follows:

$$E_1 = \epsilon_1 \cdot E_b(T_1) \tag{7}$$

Figure 7:
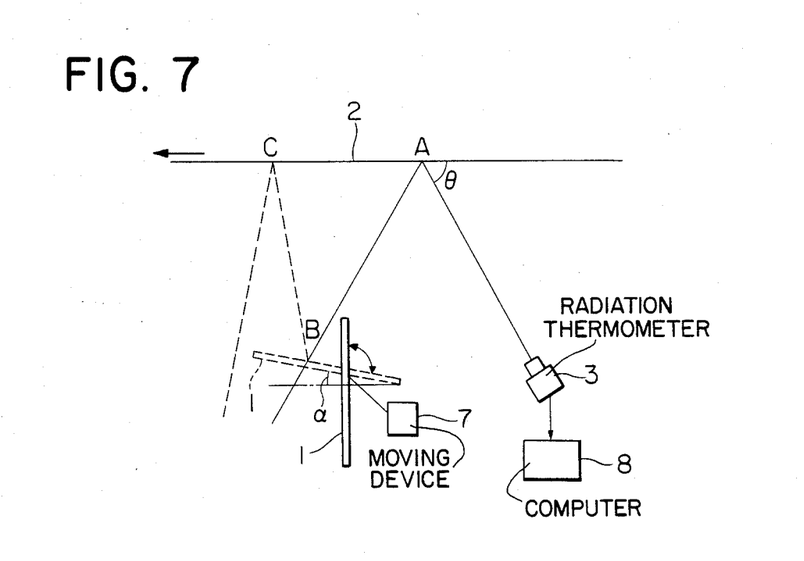
FIG. 7 is a descriptive front view illustrating another mode of moving a reflecting plate in the first embodiment of the method of the present invention as shown in FIG. 4.

In addition to moving the reflecting plate 1 in the longitudinal direction thereof as shown in FIG. 4, the moving device 7 may alternately rotate the reflecting plate 1 between the position at which the heat radiation emitted from the point C on the surface of the steel strip 2 is reflected at the point B on the surface of the reflecting plate 1, and the position at which said heat radiation is not reflected, as shown in FIG. 7.

When the reflecting plate 1 is moved by the moving device 7 to the position where the heat radiation emitted from the point C on the surface of the steel strip 2 is reflected at the point B on the surface of the reflecting plate 1, the heat radiation emitted from the point C on the surface of the steel strip 2, the heat radiation emitted from the point B on the surface of the reflecting plate 1, and the heat radiation emitted from the point A on the surface of the steel strip 2 come respectively into the radiation thermometer 3. The amounts of energy of heat radiations measured by the radiation thermometer 3 are expressed by the following formula:

$$E_2 = \epsilon_1 \cdot E_b(T_1) + \epsilon_2 \cdot r_1 \cdot E_b(T_2) + \epsilon_1 \cdot r_1 \cdot r_2 \cdot E_b(T_1) \tag{8}$$

In Formulae (7) and (8), $\epsilon_1$: emissivity of the surface of the steel strip 2,
$\epsilon_2$: emissivity of the surface of the reflecting plate 1,
$r_1$: reflectivity of the surface of the steel strip 2,
$r_2$: reflectivity of the surface of the reflecting plate 1,
$E_b(T_1)$: amount of energy of the heat radiation emitted from the surface of a perfect blackbody at temperature $T_1$ (i.e., amount of energy of reference heat radiation at temperature $T_1$),
$E_b(T_2)$: amount of energy of the heat radiation emitted from the surface of a perfect blackbody at temperature $T_2$ (i.e., amount of energy of reference heat radiation at temperature $T_2$).

In Formula (8), the first term of the right side expresses the amount of energy of the heat radiation which is emitted from the point A on the surface of the steel strip 2 and comes directly into the radiation thermometer 3; the second term of the right side expresses the amount of energy of the heat radiation which is emitted from the point B on the surface of the reflecting plate 1 and comes into the radiation thermometer 3 after the reflection at the point A on the surface of the steel strip 2; and the third term of the right side expresses the amount of energy of the heat radiation which is emitted from the point C on the surface of the steel strip 2 and comes into the radiation thermometer 3 after the reflections at the points B and A.

When the surface temperature of the reflecting plate 1 is considerably lower than that of the steel strip 2, this results in: $E_b(T_1) >> E_b(T_2)$ in Formula (8), and the second term of the right side of Formula (8) is negligible. Formula (8) can therefore be simplified as follows:

$$E_2 \approx \epsilon_1(1+r_1 \cdot r_2) \cdot E_b(T_1) \quad (9)$$

Thus, the following formula can be derived from Formulae (7) and (9):

$$E_2/E_1 = 1 + r_1 \cdot r_2 \quad (10)$$

If, on the assumption of $E_2/E_1 = k$, Kirchhoff's law, i.e., the law that the sum of emissivity and reflectivity is equal to 1, is applied here, the emissivity $\epsilon_1$ of the surface of the steel strip 2 can be expressed by the following formula since the reflectivity $r_2$ of the reflecting plate 1 is known:

$$\epsilon_1 = 1 - \frac{k-1}{r_2} \quad (11)$$

After calculation of the emissivity $\epsilon_1$ of the surface of the steel strip 2 by Formula (11), it is possible to calculate the surface temperature of the steel strip 2 from Formula (7). All these calculations are performed by the computer 8.

Now, the relation between the angle of inclination $\theta$ of the radiation thermometer 3 and the angle of inclination $\alpha$ of the reflecting plate 1 is described below, which gives the number of reflection of twice of the heat radiation emitted from the point C on the surface of the steel strip 2 between the surface of the steel strip 2 and the surface of the reflecting plate 1, and which can minimize measuring error of the surface temperature of the steel strip 2.

Figure 5:
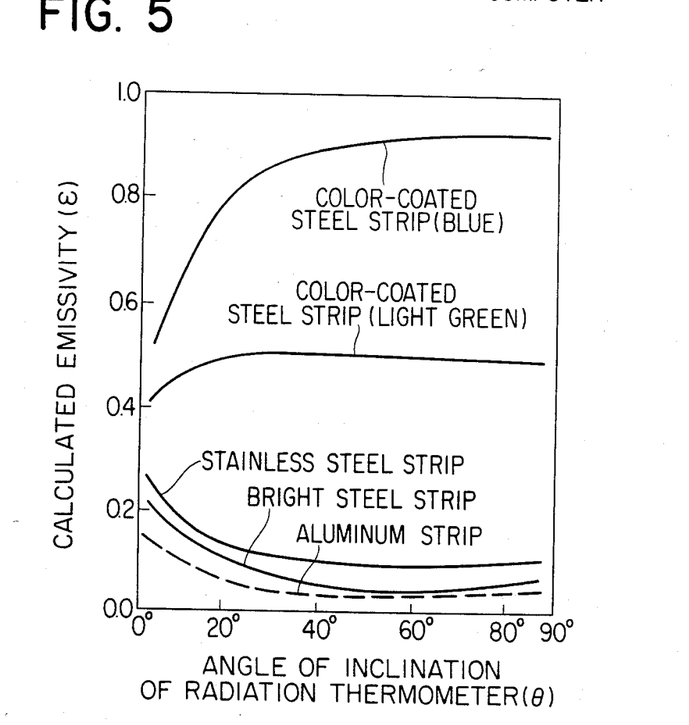
FIG. 5 is a graph illustrating the relation between an angle of inclination $\theta$ of a radiation thermometer with the surfaces of various steel strips and an emissivity $\epsilon$ of the surface of each of the various steel strips calculated on the basis of an amount of energy of a heat radiation which is emitted from the surface of each of the various steel strips and comes directly into the radiation thermometer.

FIG. 5 is a graph illustrating the relation between an angle of inclination $\theta$ of the radiation thermometer 3 with the surfaces of various steel strips and an emissivity $\epsilon$ of the surface of each of the various steel strips calculated on the basis of an amount of energy of a heat radiation which is emitted from the surface of each of the various steel strips and comes directly into the radiation thermometer 3. As is clear from FIG. 5, so far as the angle of inclination $\theta$ of the radiation thermometer 3 satisfies the condition: $40° \leq \theta < 90°$, the measured values of the emissivity $\epsilon$ are kept almost constant even when the angle of inclination $\theta$ of the radiation thermometer 3 varies within this range. On the other hand, when the angle of inclination $\theta$ of the radiation thermometer 3 is under 40°, the measured values of the emissivity $\epsilon$ vary according as the angle of inclination $\theta$ of the radiation thermometer 3 varies. In view of this fact, the angles of reflection $\theta_A$, $\theta_C$ and $\theta_B$ of the heat radiation at the points A and C on the surface of the steel strip 2 and at the point B on the surface of the reflecting plate 1 in FIG. 4 must satisfy the following condition:

$$40° \leq \theta_A, \theta_B, \theta_C < 90° \quad (12)$$

The reason is as follows: The emissivity $\epsilon_1$ of the surface of the steel strip 2 is calculated by Formula (11) on the assumption that the surface of the steel strip 2 has the same emissivity at the points A and C. As described above, however, the measured values of the emissivity $\epsilon$ vary with an angle of inclination $\theta$ of the radiation thermometer 3 of under 40°. This causes an error in the calculation of the emissivity $\epsilon_1$ by Formula (11), leading to a decreased measuring accuracy of the surface temperature of the steel strip 2.

On the assumption that the heat radiation is specularly reflected on the surface of the steel strip 2 and on the surface of the reflecting plate 1, these angles of reflection $\theta_A$, $\theta_B$ and $\theta_C$ are expressed as follows:

$$\theta_A = \theta \quad (13),$$

$$\theta_B = \theta + \alpha \quad (14),$$

where, $(\theta + \alpha) < 90°$ $$\theta_B = 180° - (\theta + \alpha) \quad (15),$$

where, $(\theta + \alpha) > 90°$ $$\theta_C = \theta + 2\alpha \quad (16), \text{ and}$$

where, $(\theta + 2\alpha) < 90°$ $$\theta_C = 180° - (\theta + 2\alpha) \quad (17),$$

where, $(\theta + 2\alpha) > 90°$

As is concluded from Formulae (12), (13), (14), (15), (16) and (17), in order to give the number of reflection of twice of the heat radiation emitted from the point C on the surface of the steel strip 2 between the surface of the steel strip 2 and the surface of the reflecting plate 1, and for the angles of reflection $\theta_A$, $\theta_B$ and $\theta_C$ to satisfy Formula (12), it is necessary for the angle of inclination $\alpha$ of the reflecting plate 1 and the angle of inclination $\theta$ of the radiation thermometer 3 to satisfy the following formulae:

$$40° \leq \theta < 90° \quad (A), \text{ and}$$

$$40° \leq \theta + 2\alpha \leq 140° \quad (B)$$

Figure 6:
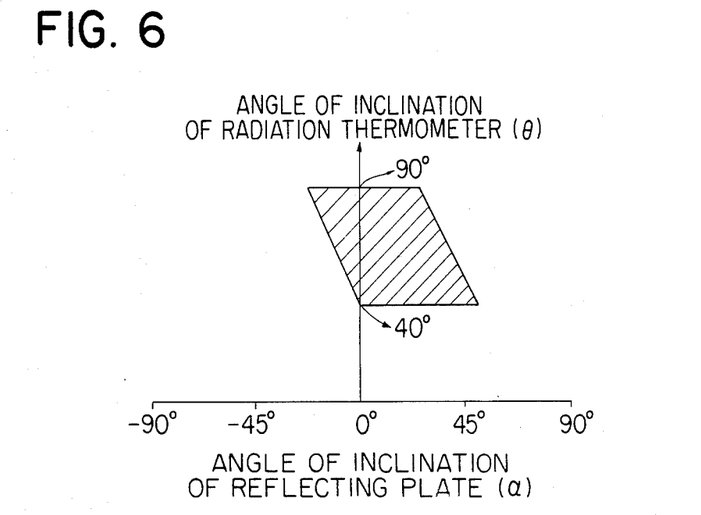
FIG. 6 is a graph illustrating the region for setting an angle of inclination $\alpha$ of a reflecting plate and an angle of inclination $\theta$ of a radiation thermometer in the first embodiment of the method of the present invention as shown in FIG. 4.

FIG. 6 illustrates the region for setting the angle of inclination $\alpha$ of the reflecting plate 1 and the angle of inclination $\theta$ of the radiation thermometer 3, enclosed by straight lines defined by Formulae (A) and (B) in the first embodiment of the method of the present invention.

The first embodiment of the method of the present invention described above is particularly effective when measuring the surface temperature of a steel strip having a relatively high emissivity.

Now, the second embodiment of the method of the present invention which permits highly accurate and easy measurement of the surface temperature of a steel strip having a relatively low emissivity is described below with reference to the drawings.

Figure 8:
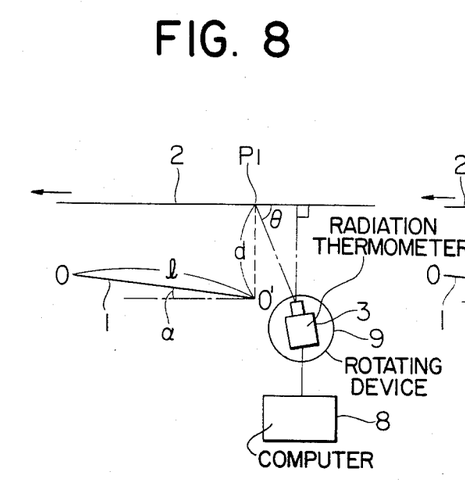
FIG. 8 is a descriptive front view illustrating the principle of the second embodiment of the method of the present invention.

FIG. 8 is a descriptive front view illustrating the principle of the second embodiment of the method of the present invention. As shown in FIG. 8, a flat reflecting plate 1 is provided below a horizontally travelling heated steel strip 2 spaced apart from the surface thereof so as to face the steel strip 2 at a prescribed angle of inclination $\alpha$ with the steel strip 2. The line formed by the intersection of the extended plane of the reflecting plate 1 with the surface of the steel strip 2 is normal to the plane of the drawing, i.e., substantially perpendicular to the travelling direction of the steel strip 2. The reflecting plate 1 is made of aluminum or other materials having a known reflectivity. A radiation thermometer 3 measures an amount of energy of a heat radiation which is emitted from the surface of the steel strip 2 and comes into the radiation thermometer 3 along the optical axis thereof. The radiation thermometer 3 is provided, with a prescribed distance to the steel strip 2, on the side of end O' of the reflecting plate 1 which has a longer distance from the steel strip 2 than the other end O of the reflecting plate 1. A rotating device 9 alternately rotates the radiation thermometer 3 between a position at which the optical axis of the radiation thermometer 3 forms a right angle with the steel strip 2 and the position at which the optical axis forms an angle of inclination $\theta$ with the steel strip 2. A computer 8 calculates the surface temperature of the steel strip 2 on the basis of the amount of energy of a heat radiation which is emitted from the surface of the steel strip 2, directly or after reflection into the radiation thermometer 3, and is measured thereby.

Figure 9:
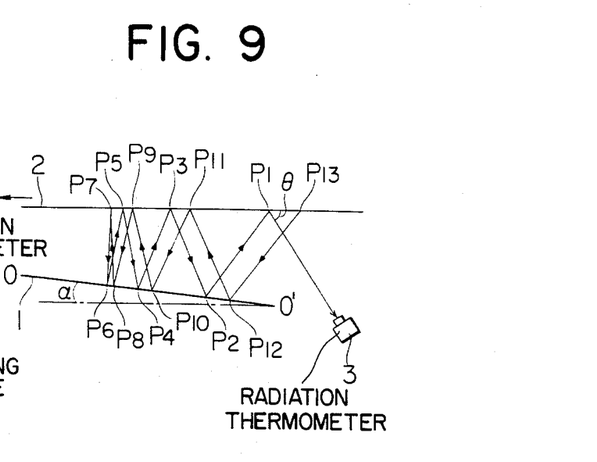
FIG. 9 is a descriptive front view illustrating the paths of heat radiations when the heat radiations emitted from points on the surface of the steel strip are reflected a plurality of times between the surface of the reflecting plate and that of the steel strip and then come into the radiation thermometer in the second embodiment of the method of the present invention.

FIG. 9 is a descriptive front view illustrating the paths of heat radiations when the heat radiations emitted from points $P_1$ to $P_{13}$ on the surface of the steel strip 2 are reflected a plurality of times between the surface of the reflecting plate 1 and that of the steel strip 2, and then come into the radiation thermometer 3 in the second embodiment of the method of the present invention. As shown in FIG. 9, a heat radiation emitted, for example, from the point $P_{13}$ would come, through reflections at the points $P_{12}, P_{11} \ldots P_1$, into the radiation thermometer 3 if the surface of the steel strip 2 and the surface of the reflecting plate 1 are specularly reflecting surfaces. All the heat radiations emitted from the points $P_1$ to $P_{12}$ other than the point $P_{13}$ also come into the radiation thermometer 3 through the paths mentioned above.

When the radiation thermometer 3 is rotated by the rotating device 9 so as to form an angle of inclination of $\theta$ with the steel strip 2, the amount of energy $E_1$ of the heat radiations measured by the radiation thermometer 3 is expressed by the following formula:

$$E_1 = \epsilon_1 \cdot \left\{ \frac{1 - (r_1 \cdot r_2)^{n_1}}{1 - r_1 \cdot r_2} \right\} \cdot E_b(T_1) + \epsilon_2 \cdot r_1 \cdot \left\{ \frac{1 - (r_1 \cdot r_2)^{n_2}}{1 - r_1 \cdot r_2} \right\} \cdot R_b(T_2) \quad (18)$$

where,
$\epsilon_1$: emissivity of the surface of the steel strip 2,
$\epsilon_2$: emissivity of the surface of the reflecting plate 1,
$r_1$: reflectivity of the surface of the steel strip 2,
$r_2$: reflectivity of the surface of the reflecting plate 1,
$E_b(T_1)$: amount of energy of the heat radiation emitted from the surface of a perfect blackbody at temperature $T_1$ (i.e., amount of energy of reference heat radiation at temperature $T_1$),
$E_b(T_2)$: amount of energy of the heat radiation emitted from the surface of a perfect blackbody at temperature $T_2$ (i.e., amount of energy of reference heat radiation at temperature $T_2$),
$n_1$: number of reflection of the heat radiation on the surface of the steel strip 2,
$n_2$: number of reflection of the heat radiation on the surface of the reflecting plate 1.

In Formula (18), the first term of the right side expresses the total sum of the amounts of energy of heat radiations emitted from the surface of the steel strip 2; and the second term of the right side expresses the total sum of the amounts of energy of heat radiations emitted from the surface of the reflecting plate 1.

In Formula (18), the numbers of reflection $n_1$ and $n_2$ can be geometrically determined in advance. When the sum of the numbers of reflection $n_1$ and $n_2$, i.e., the number of reflection n of the heat radiation emitted from the point $P_{13}$ on the surface of the steel strip 2 between the surface of the steel strip 2 and that of the reflecting plate 1 is set at a value of at least 10, it is possible to obtain a sufficiently high apparent emissivity of the surface of the steel strip 2 as described later. This ensures measurement at a higher accuracy of the surface temperature of the steel strip 2.

When the surface temperature of the reflecting plate 1 is considerably lower than that of the steel strip 2, this results in: $E_b(T_1) >> E_b(T_2)$ in Formula (18), and the amount of energy $E_1$ of the heat radiation measured by the radiation thermometer 3 can be simplified as follows:

$$E_1 = g(\epsilon) \cdot E_b(T_1) \quad (19)$$

$$= \epsilon_1 \cdot \left\{ \frac{1 - (r_1 \cdot r_2)^{n_1}}{1 - r_1 \cdot r_2} \right\} \cdot E_b(T_1)$$

where,
$g(\epsilon)$: apparent emissivity of the surface of the steel strip 2.

Then, the radiation thermometer 3 is rotated by the rotating device 9 so that the optical axis of the radiation thermometer 3 forms a right angle with the steel strip 2. In this case, the amount of energy $E_2$ of the heat radiation measured by the radiation thermometer 3 can be expressed by the following formula. If, in this case, damping of the amount of energy $E_2$ is negligible and an angle formed between the optical axis of the radiation thermometer 3 and the surface of the steel strip 2 is not affected by the reflecting plate 1, this angle is not limited to 90°:

$$E_2 = \epsilon_1 \cdot E_b(T_1) \quad (20)$$

The following formula is derived from Formulae (19) and (20):

$$E_1/E_2 = \frac{1 - (r_1 \cdot r_2)^{n_1}}{1 - r_1 \cdot r_2} \quad (21)$$

In the Formula (21), if $E_1/E_2 = k$, then Formula (21) can be rewritten as follows:

$$(r_1 \cdot r_2)^{n_1} - k \cdot (r_1 \cdot r_2) + (k - 1) = 0 \quad (22)$$

In Formula (22), since $n_1$, $r_2$ and k are known as described above, it is possible to calculate the reflectivity $r_1$ of the surface of the steel strip 2 by solving Formula (22) by the pincers operation method, for example. When the reflectivity $r_1$ of the surface of the steel strip 2 can thus be calculated, it is then possible to calculate the emissivity $\epsilon_1$ of the surface of the steel strip 2 in accordance with Kirchhoff's law as mentioned above. When the emissivity $\epsilon_1$ of the surface of the steel strip 2 can thus be calculated, it is then possible to calculate the surface temperature of the steel strip 2 by Formula (20). All these calculations are performed by the computer 8.

In Formula (22), since the value of $r_1 \cdot r_2$ satisfies the condition: $0 < r_1 \cdot r_2 < 1$ when the number of reflection n of the heat radiation is at least 10, the value of $(r_1 \cdot r_2)^n 1$ can be considered almost zero. From Formula (22) and Kirchhoff's law described above, therefore, the emissivity $\epsilon_1$ of the surface of the steel strip 2 can be calculated by the following formula:

$$\epsilon_1 = 1 - \frac{k-1}{k \cdot r_2} \quad (23)$$

Now, the relation between the angle of inclination $\theta$ of the radiation thermometer 3 and the angle of inclination $\alpha$ of the reflecting plate 1 is described below, which can give the number of reflection n of at least 10 of the heat radiation and which can minimize measuring errors of the surface temperature of the steel strip 2.

Figure 10:
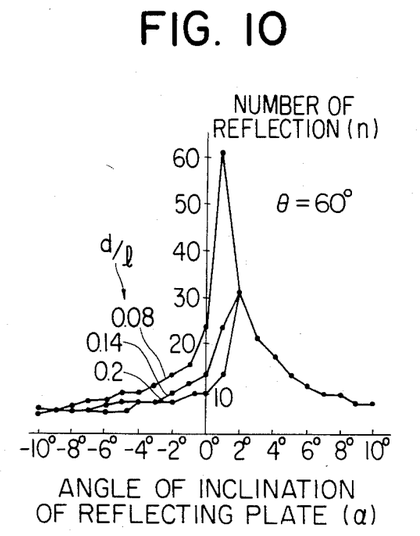
FIG. 10 is a graph illustrating, in the case with an angle of inclination $\theta$ of 60° of a radiation thermometer, the relation among an angle of inclination $\alpha$ of a reflecting plate, a ratio d/l of the distance d between an end of the reflecting plate and the surface of a steel strip to the length l of the reflecting plate, and a number of reflection n of a heat radiation emitted from a point on the surface of the steel strip between the surface of the steel strip and that of the reflecting plate in the second embodiment of the method of the present invention.
Figure 11:
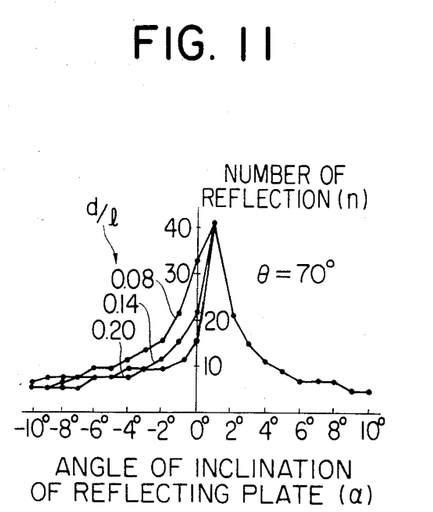
FIG. 11 is a graph illustrating, in the case with an angle of inclination $\theta$ of 70° of a radiation thermometer, the relation among said angle of inclination $\alpha$ of a reflecting plate, said ratio d/l, and said number of reflection n in the second embodiment of the method of the present invention.

FIG. 10 is a graph illustrating, in the case with an angle of inclination $\theta$ of 60° of the radiation thermometer 3, the relation among the angle of inclination $\alpha$ of the reflecting plate 1, the ratio d/l of the distance d between an end O′ of the reflecting plate 1 and the surface of the steel strip 2 to the length l of the reflecting plate 1, and the number of reflection n of the heat radiation. FIG. 11 is a graph illustrating the relation among said angle of inclination $\alpha$ of the reflecting plate 1, said ratio d/l, and said number of reflection n in the case with an angle of inclination $\theta$ of 70° of the radiation thermometer 3.

As shown in FIGS. 10 and 11, when the angle of inclination $\alpha$ of the reflecting plate 1 is at least 0°, the number of reflection n of the heat radiation becomes at least 10, irrespective of the ratio d/l. It is necessary, as mentioned above, to set the angle of reflection of the heat radiation on the surface of the steel strip 2 and on the surface of the reflecting plate 1 at a value within the range of at least 40° and under 90°. The relation between the angle of inclination $\theta$ of the radiation thermometer 3 and the angle of inclination $\alpha$ of the reflecting plate 1, which can give the number of reflection n of at least 10 of the heat radiation and at the same time satisfies the above-mentioned condition for the angle of reflection, is expressed by the following formulae:

$$\theta \leq -4.5\alpha + 87 \quad (C),$$

where, $0° \leq \alpha \leq 9°$ $$\theta \geq -5\alpha + 60 \quad (D),$$

where, $0° \leq \alpha \leq 4°$ $$\theta \geq 4\alpha + 24 \quad (E), \text{ and}$$

where, $4° \leq \alpha \leq 5°$ $$\theta \geq 0.6\alpha + 41 \quad (F)$$

where, $5° \leq \alpha \leq 9°$.

Figure 12:
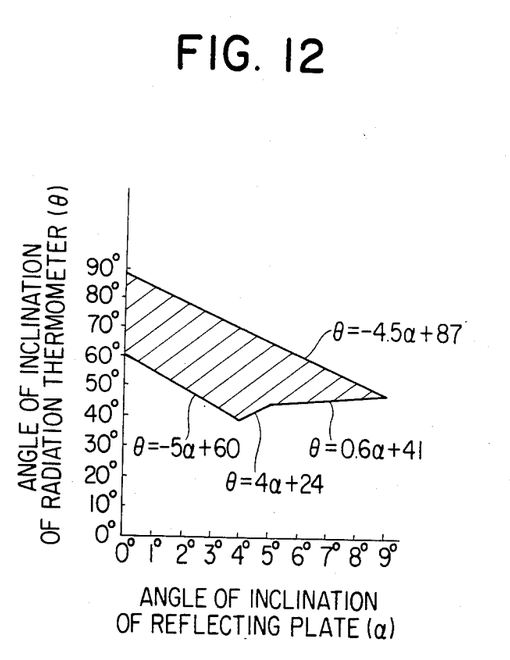
FIG. 12 is a graph illustrating the region for setting an angle of inclination α of a reflecting plate and an angle of inclination θ of a radiation thermometer in the second embodiment of the method of the present invention.

FIG. 12 illustrates the region for setting the angle of inclination $\alpha$ of the reflecting plate 1 and the angle of inclination $\theta$ of the radiation thermometer 3, enclosed by straight lines defined by Formulae (C), (D), (E) and (F).

The above description has covered the case where the radiation thermometer 3 is alternately rotated so that the optical axis thereof forms 90° with the steel strip 2, and then forms the angle of inclination $\theta$ with the steel strip 2. Two radiation thermometers may be used by installing one with the optical axis thereof forming 90° with the steel strip 2, and the other with the optical axis thereof forming the angle of inclination $\theta$ with the steel strip 2.

According to the present invention, as described above, it is possible to accurately determine the number of reflection of the heat radiation between the surface of the steel strip and that of the reflecting plate, and hence to easily perform calculation of the surface temperature of the steel strip, requiring a smaller space for the temperature measuring apparatus because of the elimination of the necessity to install a rotary chopper as in the prior art.

What is claimed is:
1. A method of continuously measuring a surface temperature of a travelling heated steel strip, which comprises:
   providing a flat reflecting plate at a prescribed position so as to face a travelling heated steel strip at a first inclination angle ($\alpha$) relative to said steel strip, said first inclination angle ($\alpha$) and said position of said reflecting plate being selectively changeable;
   directing a radiation thermometer for measuring an amount of energy of a heat radiation emitted from the surface of said steel strip toward said steel strip at a second inclination angle relative to said steel strip, said second inclination angle being selectively changeable;
   continuously measuring with said radiation thermometer the amount of energy of a heat radiation which is emitted from an arbitrary point on the surface of said steep strip and which heat radiation comes directly into said radiation thermometer;
   continuously measuring with said radiation thermometer the total sum of the amount of energy of (a) a heat radiation which is emitted from at least one different point on the surface of said steel strip other than said arbitrary point and which comes into said radiation thermometer after having been reflected at least twice between the surface of said steel strip and the surface of said flat reflecting plate and, (b) the amount of energy of a heat radiation which is emitted from a point on the surface of said steel strip which point is a final reflecting point of the heat radiation from said at least one different point, and which radiation comes directly into said radiation thermometer;
   continuously calculating emissivity of the surface of said steel strip on the basis of said total sum thus measured of the amounts of energy of the heat radiations (a) and (b), and said amount of energy of said heat radiation emitted from said arbitrary point;
   continuously measuring the surface temperature of said steel strip on the basis of said calculated emissivity of the surface of said steel strip and an amount of energy of a reference heat radiation emitted from the surface of a perfect blackbody; and
   determining a final angle of reflection ($\theta$) on the surface of said steel strip of said heat radiation emitted from said at least one different point and which has been reflected at least twice between the surface of said steel strip and the surface of said flat reflecting plate, and said prescribed angle of inclination ($\alpha$) of said reflecting plate with said steel strip, at values which satisfy the following limits:

$$40° \leq \theta < 90° \quad \text{(A); and}$$

$$40° \leq \theta + 2\alpha \leq 140° \quad \text{(B).}$$

2. The method as claimed in claim 1, comprising:
maintaining said second inclination angle of said radiation thermometer relative to the surface of said steel strip so as to correspond to said final angle of reflection ($\theta$);
said step for continuously measuring said amount of energy of said heat radiation from said arbitrary point including;
selectivity moving said flat reflecting plate from said prescribed position thereof to a position at which said heat radiation from said at least one different point fails to come into said radiation thermometer; and
said step for continuously measuring said total sum of said amounts of energy of said heat radiations including:
selectively moving said flat reflecting plate to a prescribed position at which said heat radiation from said at least one different point comes into said radiation thermometer after having been reflected at least twice by means of said reflecting plate.

3. The method as claimed in claim 1, comprising:
maintaining said second inclination angle of said radiation thermometer relative to the surface of said steel strip so as to correspond to said final angle of reflection ($\theta$);
said step for continuously measuring said amount of energy of said heat radiation from said arbitrary point including:
selectively rotating said flat reflecting plate from said first inclination angle relative to said steel strip to an inclination angle at which said heat radiation from said at least one different point fails to come into said radiation thermometer; and
said step for continuously measuring said total sum of said amounts of energy of said heat radiations including:
selectively rotating said flat reflecting plate to said first inclination angle at which said heat radiation from said at least one different point comes into said radiation thermometer after having been reflected at least twice by means of said reflecting plate.

4. The method as claimed in claim 1, comprising:
maintaining said first inclination angle ($\alpha$) of said reflecting plate;
said step for continuously measuring said amount of energy of said heat radiation of said arbitrary point including:
selectively rotating said radiation thermometer from said second inclination angle thereof to an inclination angle at which said heat radiation from said at least one different point fails to come into said radiation thermometer; and
said step for continuously measuring said total sum of said amounts of energy of said heat radiations including:
selectively rotating said radiation thermometer to said second inclination angle at which said heat radiation from said at least one different point comes into said radiation thermometer after having been reflected at least twice by means of said reflecting plate.

5. The method as claimed in claim 1, comprising:
determining said final angle of reflection ($\theta$) and said first angle of inclination ($\alpha$) at values which satisfy the following limits:

$$\theta \leq -4.5\alpha + 87 \quad \text{(C);}$$

where, $0° \leq \alpha \leq 9°$ $$\theta \geq -5\alpha + 60 \quad \text{(D);}$$

where, $0° \leq \alpha \leq 4°$ $$\theta \geq 4\alpha + 24 \quad \text{(E); and}$$

where, $4° \leq \alpha \leq 5°$ $$\theta \geq 0.6 + 41 \quad \text{(F)}$$

where, $5° \leq \alpha \leq 9°$;
thereby causing said heat radiation from said at least one different point to reflect at least ten times between the surface of said steel strip and the surface of said flat reflecting plate.

6. The method of claim 5, comprising:
maintaining said second inclination angle of said radiation thermometer relative to the surface of said steel strip so as to correspond to said final angle of reflection ($\theta$);
said step for continuously measuring said amount of energy of said heat radiation from said arbitrary point including:
selectively moving said flat reflecting plate from said prescribed position thereof to a position at which said heat radiation from said at least one different point fails to come into said radiation thermometer; and
said step for continuously measuring said total sum of said amounts of energy of said heat radiations including:
selectively moving said flat reflecting plate to a prescribed position at which said heat radiation from said at least one different point comes into said radiation thermometer after having been reflected at least twice by means of said reflecting plate.

7. The method of claim 5, comprising:
maintaining said second inclination angle of said radiation thermometer relative to the surface of said steel strip so as to correspond to said final angle of reflection ($\theta$);
said step for continuously measuring said amount of energy of said heat radiation from said arbitrary point including:
selectively rotating said flat reflecting plate from said first inclination angle relative to said steel strip to an inclination angle at which said heat radiation from said at least one different point fails to come into said radiation theremometer; and
said step for continuously measuring said total sum of said amounts of energy of said heat radiations including:
selectively rotating said flat reflecting plate to said first inclination angle at which said heat radiation from said at least one different point comes into said radiation thermometer after having been reflected at least twice by means of said reflecting plate.

8. The method of claim 5, comprising:

maintaining said first inclination angle (α) of said reflecting plate;
said step for continuously measuring said amount of energy of said heat radiation of said arbitrary point including:
selectively rotating said radiation thermometer from said second inclination angle thereof to an inclination angle at which said heat radiation from said at least one different point fails to come into said radiation thermometer; and
said step for continuously measuring said total sum of said amounts of energy of said heat radiations including:
selectively rotating said radiation thermometer to said second inclination angle at which said heat radiation from said at least one different point comes into said radiation thermometer after having been reflected at least twice by means of said reflecting plate.

* * * * *

UNITED STATES PATENT AND TRADEMARK OFFICE
CERTIFICATE OF CORRECTION

PATENT NO. : 4,553,854

DATED : November 19, 1985

INVENTOR(S) : Takeo YAMADA et al

It is certified that error appears in the above-identified patent and that said Letters Patent is hereby corrected as shown below:

Column 3, line 38, change "raidation" to --radiation--;

Column 12 (claim 1), line 35, after "sum of" insert --($\alpha$)--; after "energy of" delete "($\alpha$)";

Column 12 (claim 1), line 65, change "prescribed angle of" to --first--; after "inclination" insert --angle--;

Column 12 (claim 1), line 67, before "limits" insert --(A) and (B)--;

Column 13 (claim 2), line 25, after "of said" insert --flat--;

Column 13 (claim 3), line 35, after "angle" insert --($\alpha$)--;

Column 13 (claim 3), line 43, after "angle" insert --($\alpha$)--;

Column 13 (claim 4), line 46, after "said" insert --flat--;

Column 13 (claim 4), line 49, after "said" insert --flat--;

UNITED STATES PATENT AND TRADEMARK OFFICE
CERTIFICATE OF CORRECTION

PATENT NO. : 4,553,854

DATED : November 19, 1985

INVENTOR(S) : Takeo YAMADA et al

It is certified that error appears in the above-identified patent and that said Letters Patent is hereby corrected as shown below:

Column 13 (claim 4), line 66, after "said" insert --flat--;

Column 14 (claim 5), line 2, change "first angle of inclination" to --first inclination angle ($\alpha$)--;

Column 14 (claim 5), line 3, after "limits" insert --(C) to (F)--;

Column 14 (claim 6), line 44, after "said" insert --flat--;

Column 14 (claim 7), line 55, after "angle" insert --($\alpha$)--;

Column 14 (claim 7), line 63, after "angle" insert --($\alpha$)--;

Column 14 (claim 7), line 66, after "said" insert --flat--;

Column 15 (claim 8), line 1, after "said" insert --flat--;

Column 16 (claim 8), line 8, after "said" insert --flat--.

Signed and Sealed this

Twelfth Day of August 1986

[SEAL]

Attest:

DONALD J. QUIGG

Attesting Officer

Commissioner of Patents and Trademarks